United States Patent
Tingley et al.

(10) Patent No.: US 9,289,811 B2
(45) Date of Patent: Mar. 22, 2016

(54) APPARATUS AND METHOD OF MANUFACTURING A SPLIT LINK FOR USE IN A FLEXIBLE TUBE-BENDING MANDREL

(75) Inventors: William Q. Tingley, Grand Rapids, MI (US); Daniel R. Bradley, Grand Rapids, MI (US); William Q. Tingley, III, Grand Rapids, MI (US)

(73) Assignee: Tennine Corp., Grand Rapids, MI (US)

( * ) Notice: Subject to any disclaimer, the term of this patent is extended or adjusted under 35 U.S.C. 154(b) by 1060 days.

(21) Appl. No.: 13/197,397

(22) Filed: Aug. 3, 2011

(65) Prior Publication Data
US 2013/0031947 A1 Feb. 7, 2013

(51) Int. Cl.
B21D 9/01 (2006.01)
B21D 9/03 (2006.01)

(52) U.S. Cl.
CPC ... *B21D 9/01* (2013.01); *B21D 9/03* (2013.01); *Y10T 29/49947* (2015.01)

(58) Field of Classification Search
CPC ............. B21D 9/01; B21D 9/03; B21B 25/00
USPC .......... 72/466.2, 466, 465.1, 478, 481.1, 150; 29/525.01, 525.11, 445, 425; 403/56
See application file for complete search history.

(56) References Cited

U.S. PATENT DOCUMENTS

| | | | |
|---|---|---|---|
| 1,099,669 A * | 6/1914 | Ruckstinat | 72/150 |
| 3,190,106 A | 6/1965 | Spates | |
| 3,286,503 A | 11/1966 | Garrett | |
| 3,408,850 A | 11/1968 | Maier et al. | |
| 3,429,024 A * | 2/1969 | Postorino | 29/417 |
| 3,455,142 A | 7/1969 | Roberts | |
| 3,504,520 A * | 4/1970 | Matson | 72/466 |
| 4,123,930 A | 11/1978 | Hill et al. | |
| 4,315,423 A | 2/1982 | McGuire | |
| 4,542,637 A | 9/1985 | McGuire | |
| 4,635,464 A * | 1/1987 | McGuire, Sr. | B21D 9/03 72/466 |
| 5,588,505 A | 12/1996 | Heath | |
| 6,070,835 A * | 6/2000 | Stillinger | 248/56 |
| 6,085,572 A * | 7/2000 | McGuire, Sr. | B21D 9/03 72/466.2 |
| 6,347,776 B1 * | 2/2002 | Chuang | 248/288.51 |
| 6,955,677 B2 * | 10/2005 | Dahners | 606/287 |
| 7,219,527 B2 | 5/2007 | Yogo | |
| 7,272,922 B2 | 9/2007 | Fahrion | |
| 2010/0183381 A1 * | 7/2010 | Choi et al. | 407/40 |

FOREIGN PATENT DOCUMENTS

GB 2097854 A 11/1982
GB 2229492 A 9/1990

* cited by examiner

*Primary Examiner* — Alexander P Taousakis
*Assistant Examiner* — Gregory Swiatocha
(74) *Attorney, Agent, or Firm* — Frank M. Scutch, III

(57) ABSTRACT

A split link (800C) includes a first half link (801), a second half link (803) and a threaded aperture (805) formed in both the first half link (801) and second half link (803) for use in joining the first half link and second half link with a fastening device (807) to form a split link assembly. The split link assembly is machined to include a head portion (811), shoulder portion (813), barrel portion (815) and base portion (817) for use in providing a highly flexible tube bending mandrel.

12 Claims, 4 Drawing Sheets

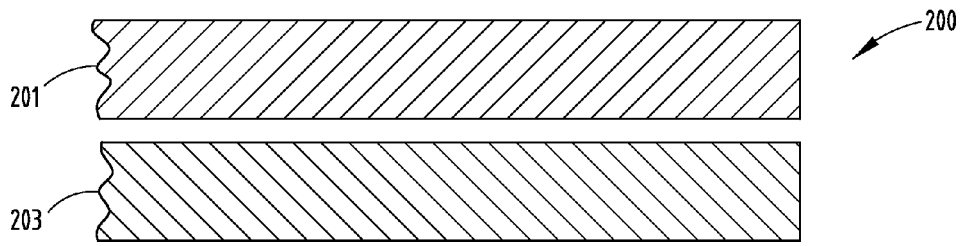
FIG. 2
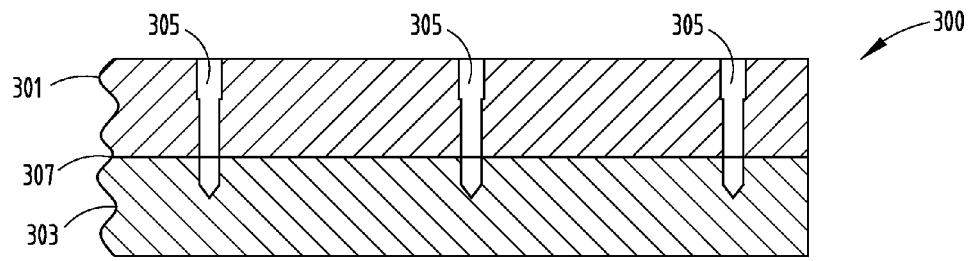
FIG. 3
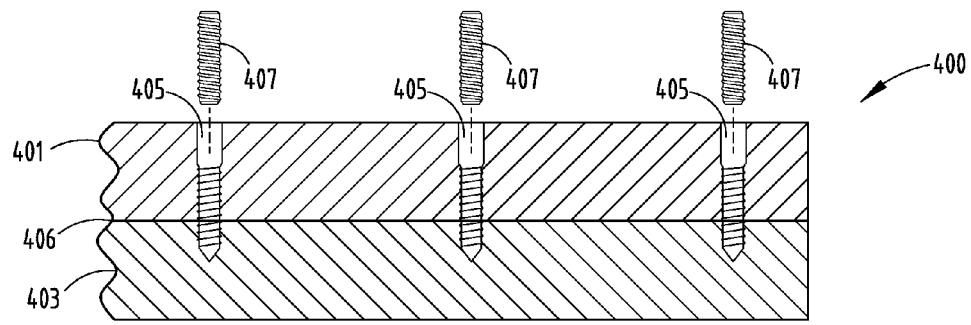
FIG. 4
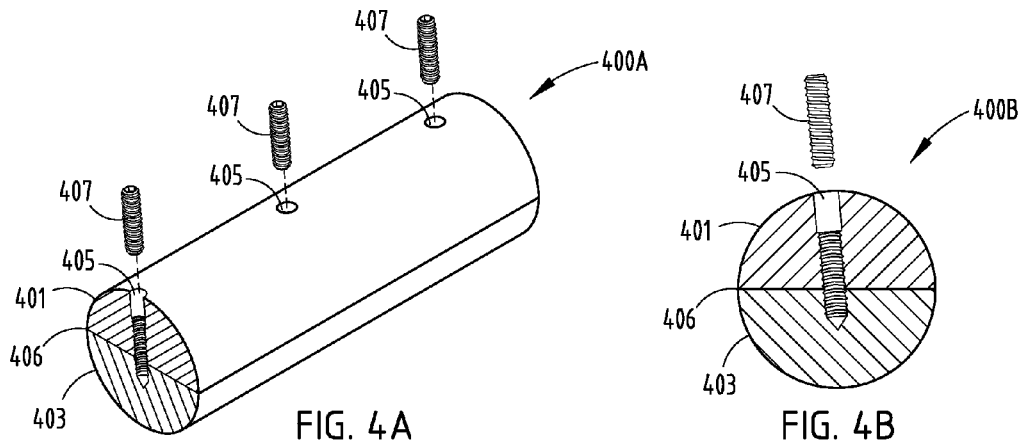
FIG. 4A
FIG. 4B

APPARATUS AND METHOD OF MANUFACTURING A SPLIT LINK FOR USE IN A FLEXIBLE TUBE-BENDING MANDREL

FIELD OF THE INVENTION

The present invention relates generally to a mechanical link assembly and more particularly to a process for manufacturing a link used in rotary-draw tube bending.

BACKGROUND OF THE INVENTION

A "link" is a mechanical device that is used for connecting the ball segments of a flexible mandrel that is used in the rotary-draw tube-bending process. As seen in FIG. 1, a typical mandrel assembly 100 includes a mandrel body 101, a nose 103, and a plurality of balls 105 and links 107, 108, 109. The assembly is inserted inside a tube in order to support its circumference or perimeter as the tube is bent using a rotary-draw tube-bending machine. Those skilled in the art will recognize that FIG. 1 illustrates a mandrel for a round tube; however, the present invention is not limited to that shape.

Further, a ball 105 fits over each link 107, 108, 109 and acts as a joint for allowing the ball to move and flex along with the tube as it is drawn over the mandrel and bent into an arc around a rotating die. Although many types of links are known in the art, the universally flexible link is best known for allowing the mandrel balls to flex in any plane during the tube bending process. As with most links, over time each ball will wear at a different rate and must be replaced to prevent the balls from developing an undesired play or slop. If not replaced, this slop will prevent tubes from maintaining a consistent circumference or perimeter throughout the arc of the bend.

Universally flexible links come in two main configurations or styles, namely the "poppet" style and the "split link" style. The poppet style link is a single piece construction where the socketed end of one link is pressed over the head of another. The socketed end, known as the barrel, is longitudinally slotted so that it opens and closes as it is pressed over the head of the other link. The poppet style link is generally less expensive to manufacture than the split link style, but it can be more difficult to assemble into a mandrel.

In contrast, a split link includes a system where the link is formed in two or more pieces that are joined together. As seen in U.S. Pat. No. 3,190,106 to Spates, which is herein incorporated by reference, Spates FIGS. 1-2 illustrate a tube bending mandrel using balls connected with links. Each link member is formed in longitudinal halves that are connected along a common line of division. In order to prevent each of the link halves from sliding against one another, the head of each half is keyed to the other into a fixed position for preventing such longitudinal movement. Other types of multi-piece designs provide a serpentine or zigzag type of joint along the common line of division for preventing movement. Still others are configured so that the head of the link is segmented into various pieces for joining the link halves to one another.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a cross-sectional view of two pieces of half-round metal or plastic stock.

FIG. 3 is a cross-sectional view of two pieces of half-round stock mated at their flat surfaces with set screw holes drilled in both pieces.

FIG. 4 is a cross-sectional view of two mated pieces of half-round stock with tapped set screw holes.

FIG. 4A is a perspective view of the two mated pieces of half-round stock shown in FIG. 4, illustrating the tapped set screw at an angle offset from the mated stock's line of division.

FIG. 4B is a cross-sectional end view of the stock shown in FIG. 4, illustrating the tapered set screw at an angle offset from of the mated stock's line of division.

Figure 1:
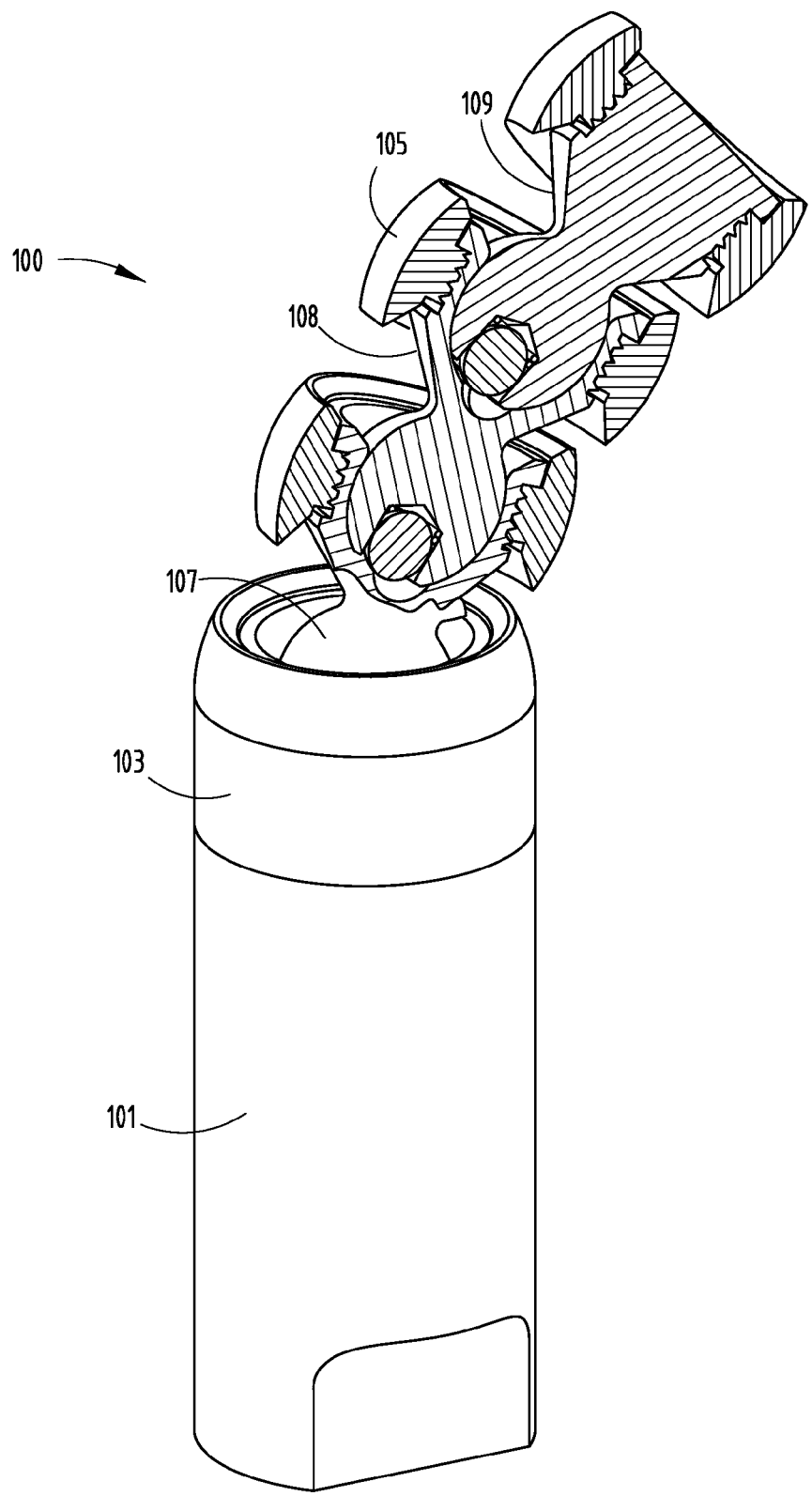
FIG. 1 is a prior art diagram showing a tube bending mandrel using a plurality of balls and links.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Before describing in detail embodiments that are in accordance with the present invention, it should be observed that the embodiments reside primarily in combinations of method steps and apparatus components related to an improved method for manufacturing a split link for use in a tube-bending mandrel. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention is directed to the manufacturing of a split link for use in a tube-bending mandrel. The term "split link" refers generally to the two longitudinal halves that make up the link vis-à-vis a one-piece "poppet" construction. The link is typically manufactured using two sections of half-round material that are joined using a plurality of set screws along its length. When the sections remain joined, each section of the stock material is quickly and inexpensively machined into the link shape shown so as to form a plurality of links for use in a tube bending mandrel. In use, the method of manufacturing the split link, as defined herein, has an inexpensive manufacturing cost compared to poppet links and other types of split links, simple shipment and storage methods compared to other types of split links, and easier assembly into mandrels compared to poppet links and most other types of split links. The method of manufacture as described herein also allows the link to be configured in a way that improves its durability.

FIG. 2 is a cross-sectional view showing two pieces of metal or plastic stock as used in the method of manufacturing a split link according to an embodiment of the invention. As seen in FIG. 2, two generally identical half-round bars of stock 200 are aligned such that the flat surfaces of first half-round bar 201 and a second half-round bar 203 are positioned over one another. Both the first half-round bar 201 and second half-round bar 203 are made of a pre-hardened alloy steel or other material of sufficient tensile and yield strength having a predetermined length. The length of the first half-round bar 201 and second half-round bar 203 are selected so that they can be machined into one or more mated pairs of split link halves for use in a tube-bending mandrel. Although "half-round" stock might be used in this process, it will be evident to those skilled in the art, that bars of different shapes, such as square or rectangular flat stock, can also be used so long as each bar has a sufficiently precise flat surface that can be joined to one another.

FIG. 3 is a cross-sectional view showing the two pieces of joined stock with set screw holes drilled therein. The bar assembly 300 is illustrated showing the first bar 301 positioned atop the second bar 303 along their longitudinal dimension. The first bar 301 and second bar 303 are oriented so that their flat surfaces face one another. As seen in FIG. 3, the two sections of the assembly are held together by clamping, welding, or the like. Once affixed in this manner, the bar assembly 300 will function as a single bar of stock that can be machined during the manufacture of one or more links for a tube bending mandrel. Typically, each bar features at least one flat surface along its longitudinal axis. The flat surface is sufficiently true and has a smooth surface so that there are no gaps or hollows between the first bar 301 and second bar 303 when joined to one another. The bar assembly 300 is fixtured for drilling the set screw holes 305 so that they are not orthogonal to bar assembly 300 but instead are drilled at a substantially small angle typically in a range between 5 to 10 degrees from normal, i.e., the mutual line of division 307. As described herein, this offset of the screw holes 305 allows the bar assembly 300 to be fixedly joined using a greater force so the set screw cannot easily back out of a set screw hole 305 by shearing forces. Furthermore, each hole is positioned along the longitudinal axis of the bar assembly 300 so that the hole can be used at a predetermined position in the head of the link.

FIG. 4 is a cross-sectional view showing each half of the bar assembly 400 with the flat surfaces positioned on top of one another with tapped set screw holes 405 formed therein. FIG. 4A is a prospective view of the bar assembly showing the two halves 401, 403 of the bar assembly 400A positioned together along their flat surfaces along a line of division 406 as shown in FIG. 4. FIG. 4B is an end view of the bar assembly 400B that more clearly illustrates the angle of the set screw hole(s) 405 to the line of division 406. As seen in FIGS. 4, 4A and 4B, during the manufacturing process, the bar assembly 400 is fixtured for tapping the drilled set screw holes. Upon completion of the tapping of the set screw holes 405, the set screws 407 are ready to be threaded into the bar assembly 400 which act to hold the bar assembly 400 together as a single bar of stock without movement of the bar halves 401, 403 relative to one another for further processing.

Figure 5:
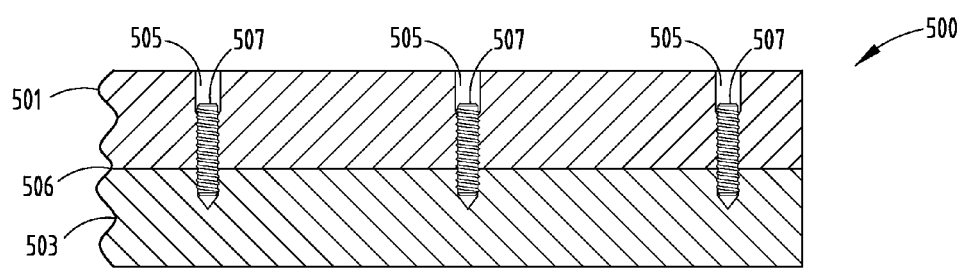
FIG. 5 is a cross-sectional view of the two mated pieces of half-round stock with the set screws fastening them together to function as a single bar of stock for further processing.

FIG. 5 is a cross-sectional view showing the bar assembly with the set screws mounted therein. The bar assembly 500 is illustrated showing the first half-round bar 501 and the second half-round bar 503 oriented to accept one or more set screw(s) 505 that are mounted in the threaded hole(s) 507. The set screw 505 has a predetermined size such that when the screw joins both the first half bar 501 and second half bar 503, its entire length will be within the portion of the bar assembly 500 that will be formed into the head portion of the link. The set screw 505 is at a predetermined location so that the set screw 505 will continue to hold together both halves of the link 501, 503 together after they are separated from the bar assembly 500. Furthermore, as will be evident with regard to FIG. 6 as described herein, this allows the upper portion of the hole 507 to remain clear so that material above and around the set screw(s) 505 can be removed during the machining process without damaging the screw 505.

Figure 6:
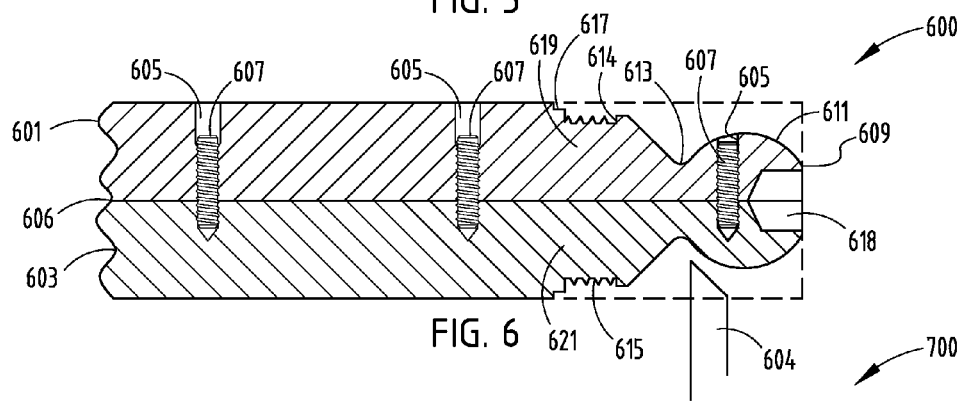
FIG. 6 is a cross-sectional view of the joined stock after the outside contour of a split link (showing an optional threaded barrel feature) has been machined into one end.

FIG. 6 is a cross-sectional view of the bar assembly showing the machining of the outside contour of the split link from one end of the bar assembly. The bar assembly 600 is shown where the first bar 601 and second bar 603 are joined along a line of division 606 using one or more set screws 605. The drawing illustrates one of a series of cutting tools 604 that can be used to cut and form the face 609 as well as the outside contour shoulder 613, retaining ring groove 614, barrel 615 (shown with optional threading feature), the split link head 611 and the base 617. The outside contour shoulder 613 is machined into sides that are conical in shape. Although not shown in FIG. 6, another tool is used to drill the detent hole 618. Thus, the bar assembly 600 is formed into the link that is comprised of a first half 619 and second half 621 that remain tightly fastened by set screw(s) 605 within the threaded hole(s) 607 during the machining process. In use, the bar assembly 600 can be fed through a spindle of a computer numerical control (CNC) lathe to a mechanical or electronic stop. This allows the inserted set screw(s) 605 to be precisely positioned within the work envelope of the lathe while turning the bar assembly 600. This enables the set screw(s) 605 to be in their proper location within each of the finished links.

Figure 7:
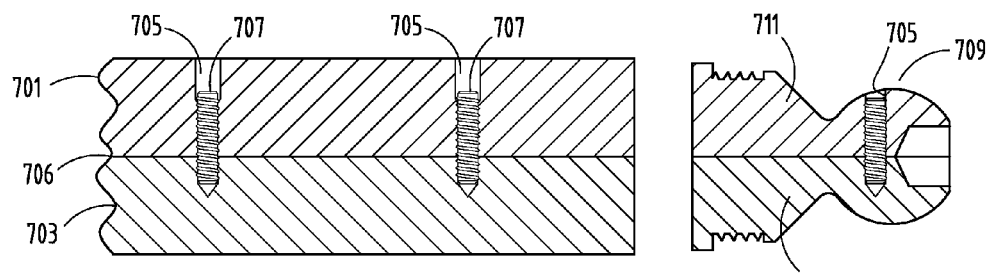
FIG. 7 is a cross-sectional view of the joined stock and the split link after it has been separated from the stock.
Figures 8A, 8B, 8C:
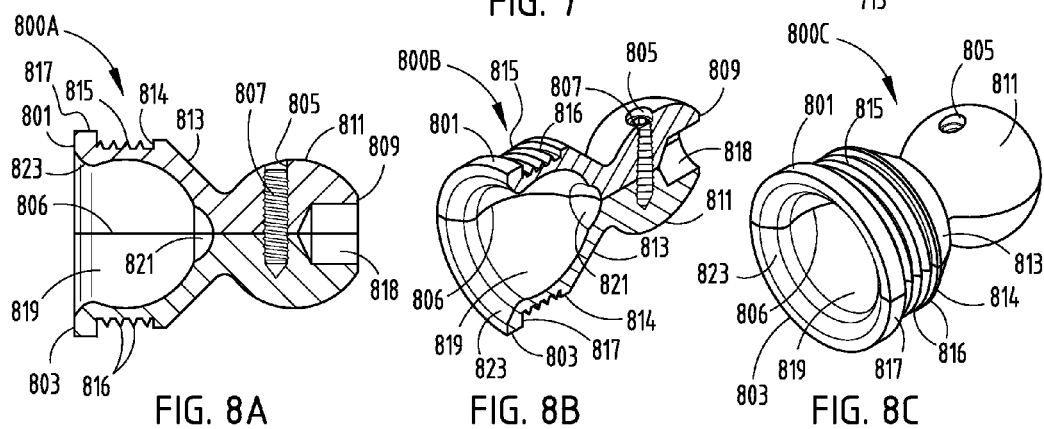
FIG. 8A is a longitudinal cross-sectional view of the finished split link showing an optional threaded barrel feature.
FIG. 8B is a cross-sectional view of the finished split link shown in FIG. 8A, illustrating the inserted set screw at an angle to the perpendicular of the split link's line of division.
FIG. 8C is a perspective view of the finished split link with the longitudinal halves joined together and held in the proper configuration with the set screw.

FIG. 7 is a cross-sectional view showing a bar assembly where a machined split link is separated from the bar assembly. The bar assembly 700 is illustrated having the first bar 701 and second bar 703 remaining joined along the line of division 706 after the machining process. The split link assembly 709 includes link half 711 and link half 713 that remain fixedly joined using the set screw 705. The split link 709 is cut from the bar assembly 700 and separated at some predetermined distance allowing for a completed link 800A having predetermined length as illustrated in FIG. 8A as described herein. This process is repeated until the bar assembly 700 is spent and/or completely consumed by machining a plurality of completed split link assemblies. Thereafter, the link(s) may be further machined to form a socket to its finished dimensions.

FIGS. 8A, 8B and 8C illustrate various views of the finished link assembly. FIG. 8A is a side cross-sectional view of the split link. FIG. 8B is a perspective cross-sectional view of the split link shown in FIG. 8A. FIG. 8C is a perspective view of the split link in its finished form. With regard to FIGS. 8A, 8B and 8C, the split link in its finished form is illustrated with both the first half 801 and second half 803 of the link joined using a set screw 805 along the line of divisional 806. The set screw 805 is positioned within the head 811. A detent recess 818 located within the head 811 is used for holding a biasing spring (not shown) and ball (not shown) therein. The biasing spring is used to align the ball-and-link sub-assembly of the mandrel in a straight line for insertion into and retraction from the tube during the tube-bending process. This operates by the spring pressing the ball into the recess 821 located at the top of the split link's socket 819.

As seen in FIGS. 8A and 8B, the socket 819 is positioned within the barrel 815 of the split link which works to contain the head 811 of another link which allows a predetermined number of links that can be connected in-seriatim. The barrel 815 of the link may optionally include threads 816 on the exterior surface (as illustrated) for attachment of a ball segment. The threads 816 are used for improving the stability of the ball segment along the longitudinal axis of the flexible mandrel while also facilitating the distribution and equalization of the forces of the bending process to both halves 801, 803 of the link. When the link is manufactured without the threads 816, the barrel 815 will have a smooth cylindrical surface. A retaining ring groove 814 is located between the barrel 815 and the shoulder 813 for allowing a retaining ring (not shown) to frictionally engage within the retaining ring groove 814 in order to fasten a ball segment (not shown) into a substantially fixed position around the barrel 815.

As seen in FIG. 8B, the lower or bottom portion of the base 817 is machined to include a tapered lip 823 at the throat of the socket 819. The tapered lip 823 is used to increase the clearance for the shoulder of another link whose head 811 is inserted into the socket 819. This works to maximize the overall flexibility of the connected links relative to one another. As a final step, the split link 800A, 800B, 800C can be tumbled for removing burrs and imparting a uniform finish to its outside surfaces. By the manufacturing process as described herein, the two halves 801, 803 of the link remain fixed to each other in the same position during manufacturing, storage, and use, with no movement of the link halves 801, 803 relative to each other. Further, the two halves 801, 803 remain readily detachable for assembly into a flexible tube-bending mandrel by unscrewing the set screw 807.

Figure 9:
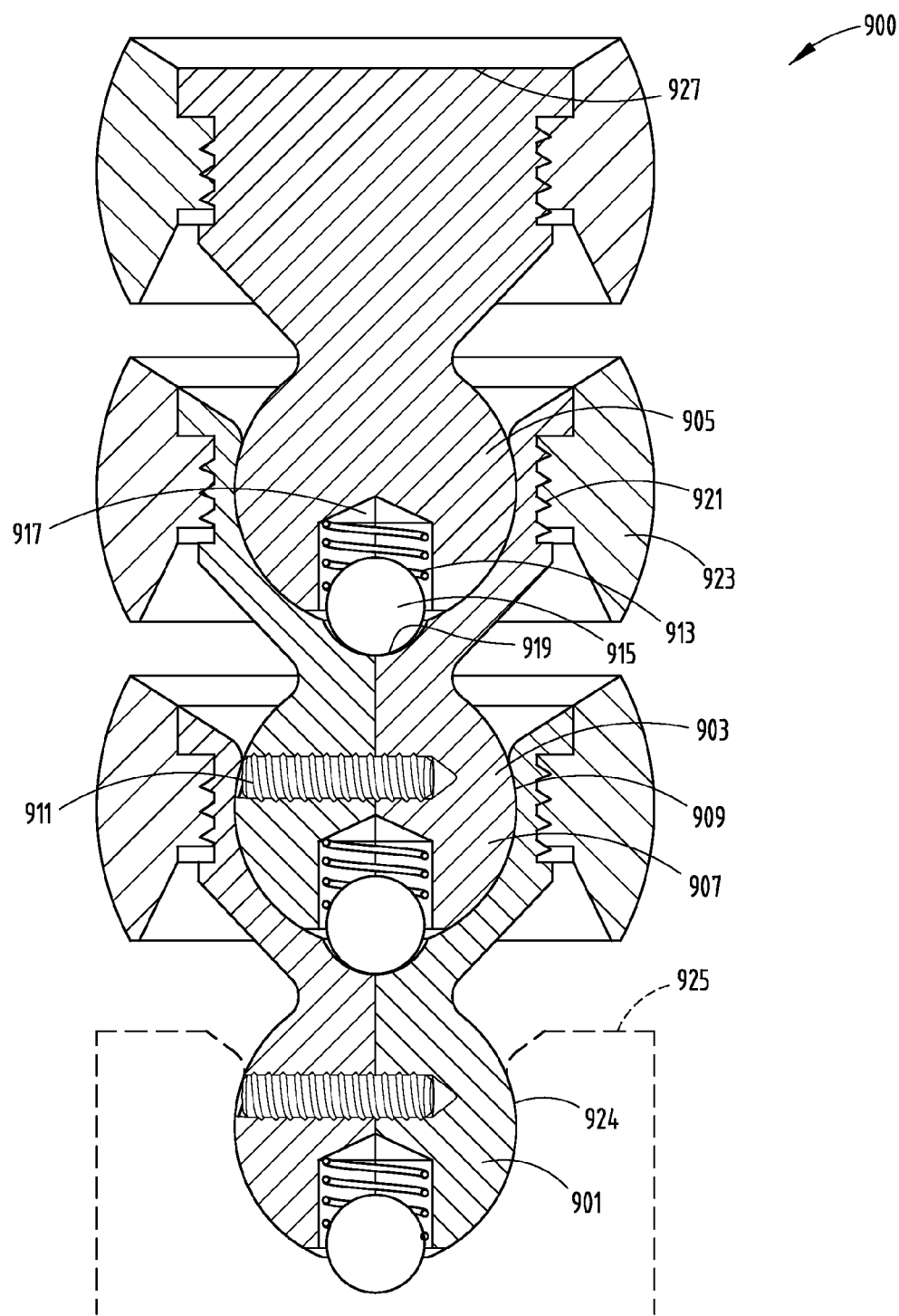
FIG. 9 is a cross-sectional view showing a plurality of split links assembled with ball segments as a part of a flexible mandrel.

FIG. 9 is a cross-sectional view showing a plurality of split links and ball segments joined together as a sub-assembly for use in a flexible mandrel. As seen in FIG. 9, a ball-and-link subassembly 900 includes a plurality of joined link assemblies 901, 903, 905. By way of example, the links are joined by placing a link head 907 into the socket 909 of an adjoining link. As described herein, each of the link assemblies are held together using a set screw 911. A spring 913 and ball 915 are shown positioned within a detent hole 917 for providing a biasing force into a small recess 919 located on the interior surface of the socket by pushing the link in a rearward direction. The optional threads 921 are shown on the barrel of the link for engagement with a ball segment 923. A retaining ring can be used to hold the ball segment 923 in place relative to the link. The link 903 is shown connected to a mandrel link 901. The mandrel link 901 has the same basic link configuration as other links except for a cylindrical outside contour 924 for attachment to the mandrel body 925. As it is the last or end link, the end link 905 does have the same basic configuration as the other links; however, it is manufactured as a single-piece link having a flat bottom surface 927 and no socket for connection to other links.

Generally, the split link and method of manufacture as described herein significantly reduces the cost of links that are assembled into a mandrel while functioning in a manner similar to prior art links. The use of CNC machine tools and parametric programming for manufacturing the link by the methods as described herein, permit the economical production of links to custom dimensions. This is often necessary in order to give a flexible mandrel either the clearance to bend tubes with small bending radiuses relative to the tube diameter or the additional durability to bend tubes with thick walls relative to the tube diameter.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A split link for use in a tube bending mandrel having a head portion, shoulder portion, barrel portion and base portion comprising:
   a first half link;
   a second half link;
   a threaded hole formed in the head portion and angularly pitched toward the base portion of both the first half link and second half link for use in joining the first half link and second half link along a line of division separating the first half link and second half link with a threaded set screw that extends into each half of an inner surface defined by a flat, two-dimensional longitudinally split surface for holding the first half link and second half link into a fixed position relative to one another; and
   wherein the entire longitudinally split surface of the first half link and second half link is substantially flat and has no key or keyway formed therein, and the threaded hole is positioned directly adjacent to and offset at approximately five degrees to a line of division separating the first half link and second half link for precluding movement of the first half link and second half link relative to one another during machining without the use of a retaining ring.

2. A split link as in claim 1, further comprising:
   a socket formed within the base portion of the split link assembly for use in joining another split link.

3. A split link as in claim 1, further comprising:
   a threaded outer surface on the base portion for attachment of a mandrel ball to the split link assembly.

4. A split link assembly having at least a head portion and a base portion for use in a tube bending mandrel comprising:
   a first half link split along its length;
   a second half link split along its length;

a threaded hole having a downward pitch extending within the head portion towards the base portion formed in both the first half link and second half link for use in joining the first half link and second half link with a threaded screw fastener to form a split link assembly; and wherein the split link assembly is machined from a plurality of metallic bars using the threaded screw fastener installed at an oblique angle directly adjacent to a line of division defined by the continuously flat, longitudinally split, surfaces extending between the metallic bars where the first half link and second half link are separated from the split link assembly at a predetermined distance below the head portion and where the threaded hole is offset at approximately five degrees downward pitch from the head portion towards the base portion for precluding movement of the first half link and second half link relative to one another during machining without the use of a key or retaining ring so that the first half link and second half link remain an identical match.

5. A split link assembly as in claim 4, further comprising:
a threaded socket located into abuse portion of the split link for use in joining another split link.

6. A split link assembly as in claim 4, wherein an outer surface of the split link is threaded between a base portion and a shoulder portion for attachment of a mandrel ball to the split link.

7. A split link assembly as in claim 4, wherein a fastening device is threaded into at least one threaded hole formed into the bar assembly.

8. A split link assembly as in claim 4, wherein the at least one fastening device is a set screw for precluding movement of the plurality of metallic bars relative to one another.

9. A split link for use in a tube bending mandrel comprising:

a plurality of metallic bars joined along their two-dimensional longitudinal dimension to form a bar assembly where a plurality of downwardly pitched holes are formed at predetermined positions along the length of the bar assembly that are offset at an angle to a line of division between halves of the bar assembly and at least one hole is tapped in the bar assembly;

at least one fastening device positioned into at least one of the plurality of holes at a 5 degree angle to a line of division in the bar assembly for holding the bar assembly into a fixed position; and wherein the bar assembly is machined to form a split link defined as having:
a first half link;
a second half link; and
a threaded hole formed in a head portion and pitched toward a base portion of both the first half link and second half link for use in joining the first half link and second half link along a line of division that separates the first half link and second half link with a threaded set screw that extends into each half of an inner surface in the head portion of the first half link and second half link each having a continuously flat, keyless, two-dimensional longitudinally split surface that is held together without the use of a keyway or retaining ring to preclude movement relative to one another.

10. A split link as in claim 9, further comprising:
a threaded socket formed in a base portion of the split link.

11. A split link as in claim 9, further comprising:
a threaded outer surface machined into the split link for use with a mandrel ball.

12. A split link as in claim 9, wherein the plurality of metallic bars are half-round stock.

* * * * *